United States Patent Office 2,710,437
Patented June 14, 1955

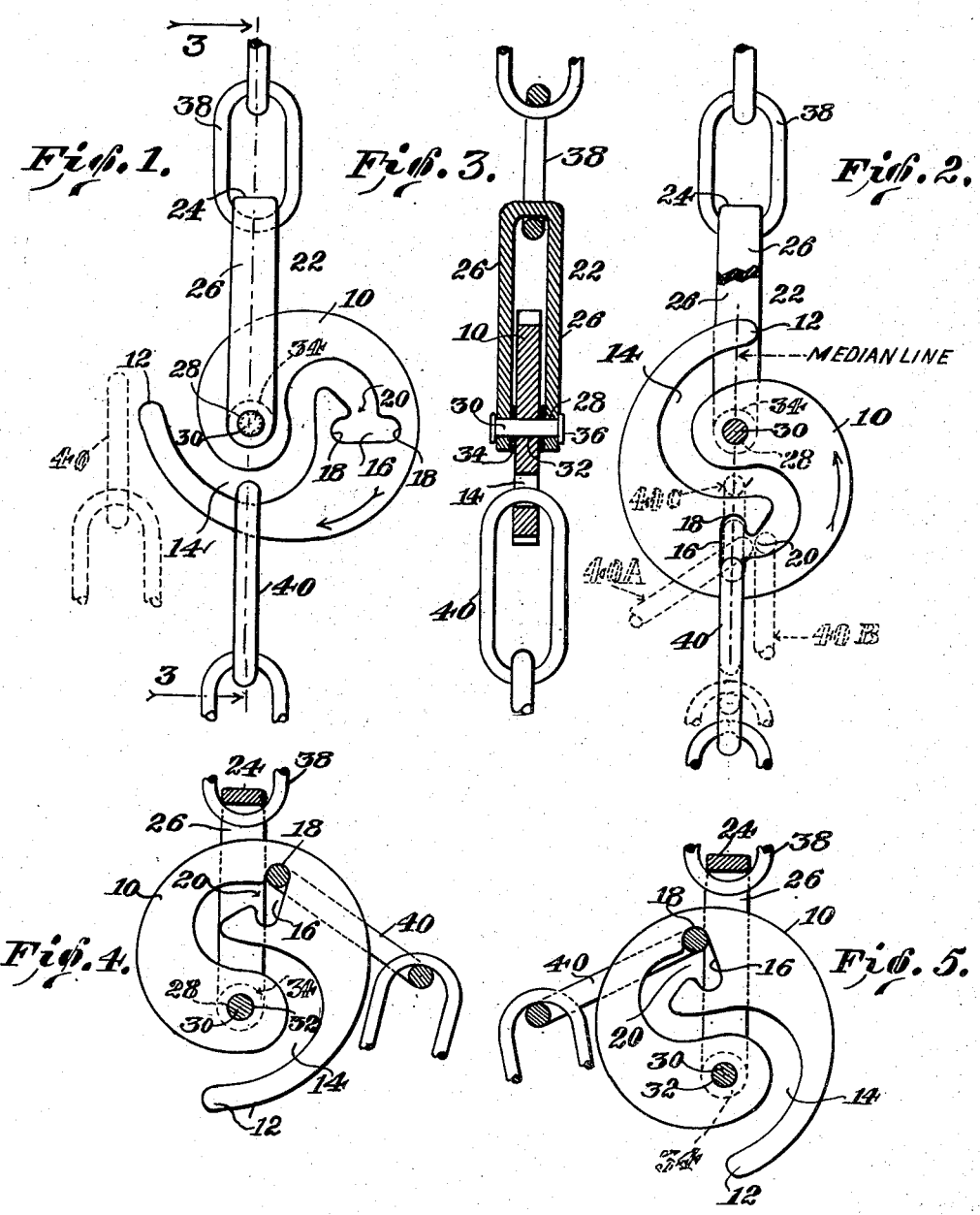

2,710,437

CHAIN FASTENER

David E. Wilson, Arlington, Va.

Application May 15, 1952, Serial No. 287,831

3 Claims. (Cl. 24—69)

This invention relates to chain fasteners, and more particularly to providing a type of fastener by means of which the ends of the side chains of an anti-skid chain may be quickly fastened together in a manner to insure that they will not accidently come apart while in use and yet so designed as to be readily disconnected from the tire of a vehicle.

Many of the side chain locking devices now in use on skid chains are of a design extremely difficult to operate owing to the so called jack knife arrangement of the locking members, more particularly the locking member that is attached to the side chain on the inside portion of the tire. To lock or unlock this type of fastener when on the inside of the tire, requires the operator to crawl part way under the rear end of the car in order to see which way to spring the device in order to accomplish the task.

The object of my invention is to provide a chain fastener that is free from the difficulties mentioned in locking and unlocking the device, that may be readily and quickly fastened to or detached from the end links of the side chains and when attached will be secure from accidental detachment.

Another object of the invention is to provide a chain fastener that is simple to operate, inexpensive to manufacture, and rugged enough to stand the wear and tear required of such a device.

Another object of the invention is to provide a chain fastener that can be attached with one hand of the operator to the end link of a side chain by sense of touch, that can be moved into locking position by rotating the disk member through an arc of approximately ninety degrees, and that will maintain the end link of the side chain in locked position until manually released.

It is a further object of my invention to provide a chain fastener that will maintain the link end of a side chain in a permanent trapped position in an elongated slot located within the circular disk portion of the device, secure from unintentional displacement until the circular disk of the device is rotated by hand, clockwise, sufficient to permit the movement of the side chain end link into the S-shaped channel where it may be released by counterclockwise rotation.

It is a further object of my invention to provide a chain fastener with holding means to prevent rotation of the circular disk member, after same is placed in a fixed position handy to receive the end link of a side chain.

With these and other difficulties in mind it is an object of my invention to provide a chain fastener, that is easy to operate, that can be quickly fastened to the end link of a side chain and can be readily disconnected from same when desired, and can be fastened or unfastened at night without the aid of light, and is provided with positive securing means against unintentional displacement of the end link of the side chain at all times while in use. With these and other objects in view the invention will now be described with reference to the accompanying drawings and will be pointed out in the appended claims. In the accompanying drawings, I have shown one embodiment and one modification thereof which my invention may assume in practice.

In the accompanying drawings:

Figure 1 is a side elevation of the chain fastener, connected to one of the end links of a side chain, also connected to the opposite end link of said chain, ready to move through the S-shaped channel to the elongated slot.

Figure 2 is a side elevation similar to Fig. 1, showing the side chain end link moved into the locked position in the elongated slot where it will remain until removed by hand.

Figure 3 is a sectional view taken on line 3—3 of Fig. 1.

Figure 4 is a side elevation partly in section showing the circular disk member moved to the extreme right side of the yoke member by reason of a slack chain, to show the end link locked against escape from the elongated slot member.

Figure 5 is a similar view to Fig. 4, showing the circular disk member moved to the extreme left side of the yoke by reason of a slack chain, to show the end link locked against escape from the elongated slot member.

Referring now more particularly to the drawings the reference character 10 designates generally the chain fastener formed of a substantially circuluar metal disk, having a tip member 12 extending outward from said circular metal disk in a manner suitable to form a hook to receive a side chain end link 40, of an anti-skid chain. A somewhat S-shaped channel 14 extends into the body portion of the circular disk and terminates in a transverse T slot or trapping means 16 which is provided at its ends with link seats 18 to receive the rounded end of the side chain end link 40. The opening on one side of the elongated T slot 16, which I shall designate as the throat 20, is slightly greater than the chain diameter of the material of the side chain end link 40, of sufficient width only to permit the passage of the side chain end link when manually operated, and to prevent any possible unintentional displacement of said end link while secured in the T slot as shown in Fig. 2 of the drawing.

With the end link 40 seated in the lower end seat 18 of the slot 16, it will be obvious as shown in Fig. 2 of the drawing that any end thrust of the end link 40 from a state of tension to a slacking of the side chain, will cause the rounded end of the said end link to pass by the throat 20 and engage the opposite end link seat 18 of said T slot. Any further thrust of said end link of the side chain will cause the circular disk member to assume the position either to the right of the longitudinal median line of Fig. 2, as illustrated in Fig. 4, or to the left of said longitudinal median line, and assume the position as shown in Fig. 5 of the drawing.

To disengage the end link 40, from the T slot 16, it is necessary to tilt said end link 40 to an approximate angle of forty five degrees as shown in dotted position at 40–A in Fig. 2 and pass said link end through the throat 20, and by moving the circular disk slightly clockwise, the end link will come to rest in a vertical position as shown in Fig. 2 of the drawing at 40–B. From this position the end link is moved around the curved portion of the S-shaped channel 14 to the dotted position as shown in Fig. 2 of the drawing by reference character 40–C. At this position, by moving the circular disk in a counterclockwise direction, to a position similar to that shown in Fig. 4 of the drawing, the end link will drop away from the S-shaped channel of the chain fastener.

A yoke shaped member 22 comprising a head 24 and depending arms 26 is pivotally mounted at the lower end of said arms to the body portion of the circular disk member. Said arms at their lower ends being provided with apertures 28 to receive a pivot pin 30 which passes through an aperture 32 in the body portion of the circular disk member. Spacing washers 34 are provided, being mounted on the pivot pin 30 and positioned between the ends of the depending arms 26 and the body portion of the circular disk 10. Pivot pin 30 is riveted at its outer ends 36 to secure same from displacement and to compress the lower ends of the depending arms yoke against the space washers 34 and the circular disk member 10 to produce sufficient friction between the parts to hold the circular disk member from moving out of a set position when attaching the end link of a side chain to the chain fastener. With the upper side chain end link 38 and the lower side chain end link 40 connected to the tip end of the circular disk member as shown in Fig. 1 of the drawing, the device is in position to be rotated in the direction of the arrow shown in Fig. 1 clockwise, approximately ninety degrees, which will move the lower side chain end link 40 into the slot 16 as shown in Fig. 2 of the drawing. When the side chain end link is under tension, it will be obvious that the end link 40 will be securely held in locked position and should there be any momentary slack in the side chain while in movement, the side chain link end will merely travel or move to the opposite end of the slot 16 as shown in dotted lines in Fig. 2. Should the side chain for any reason receive more slack than has been stated, the end link of the side chain would assume the extreme position as shown in Figs. 4 and 5 where it comes in contact with the yoke member and is prevented from further backward movement, at all times being trapped in the S-shaped channel within the circular disk member. It is to be noted that one loop of S-shaped slot 14 in passing from the opening at the periphery of the disc to the T-slot, passes partly about the pivot means.

While I have herein set forth a preferred embodiment of my invention, it is to be understood that any suitable material may be used in the manufacture of the chain fastener, and that any variations in the shape and relative arrangement of the parts such as come within the scope of the claims appended herewith are to be regarded as forming part of my invention.

I claim:

1. In a chain fastener, a yoke member having pivot openings, a substantially circular disc member, having an eccentric pivot opening, pivot means in said pivot openings, said disc being rotatable on said pivot means and being provided with a substantially S-shaped slot having a throat opening at its periphery substantially at a point nearest the pivot axis, one loop of said slot passing partly about said pivot axis and end in a T-slot substantially opposite said pivot axis from the point of entrance, said T-slot being substantially in line with said pivot means and the opening of said S-shape slot, the construction and arrangement being such that accidental movement of a chain linke inserted in said slots is arrested by said T-slot and said yoke member.

2. The structure in claim 1 in which friction means are provided on the pivot means to hold the disc in position for placing a link in the S-shaped slot.

3. In a chain fastener, a yoke member adapted to be attached at one end of a chain and having pivot openings therein, a disc member, for receiving the other end of the chain having an eccentric pivot opening, pivot means mounted in said openings, said disc member having a substantially S-shaped slot therein opening at a point nearest the pivot means, one loop of said S-shaped slot passing partly about the pivot means and terminating in a T-slot opposite the pivot from the opening, said T-slot being substantially in line with said pivot means and said S-shaped slot opening, said slots being adapted to receive and trap a chain link and being rotatable about said pivot means from a receiving position to a trapping position, such positions being spaced substantially one hundred eighty degrees apart about said pivot means.

References Cited in the file of this patent

UNITED STATES PATENTS

| | | |
|---|---|---|
| 1,418,149 | Hubble | May 30, 1922 |
| 1,494,289 | Round | May 13, 1924 |

FOREIGN PATENTS

| | | |
|---|---|---|
| 11,612 | Germany | Nov. 20, 1880 |
| 400,765 | Germany | Aug. 16, 1924 |